Patented May 22, 1951

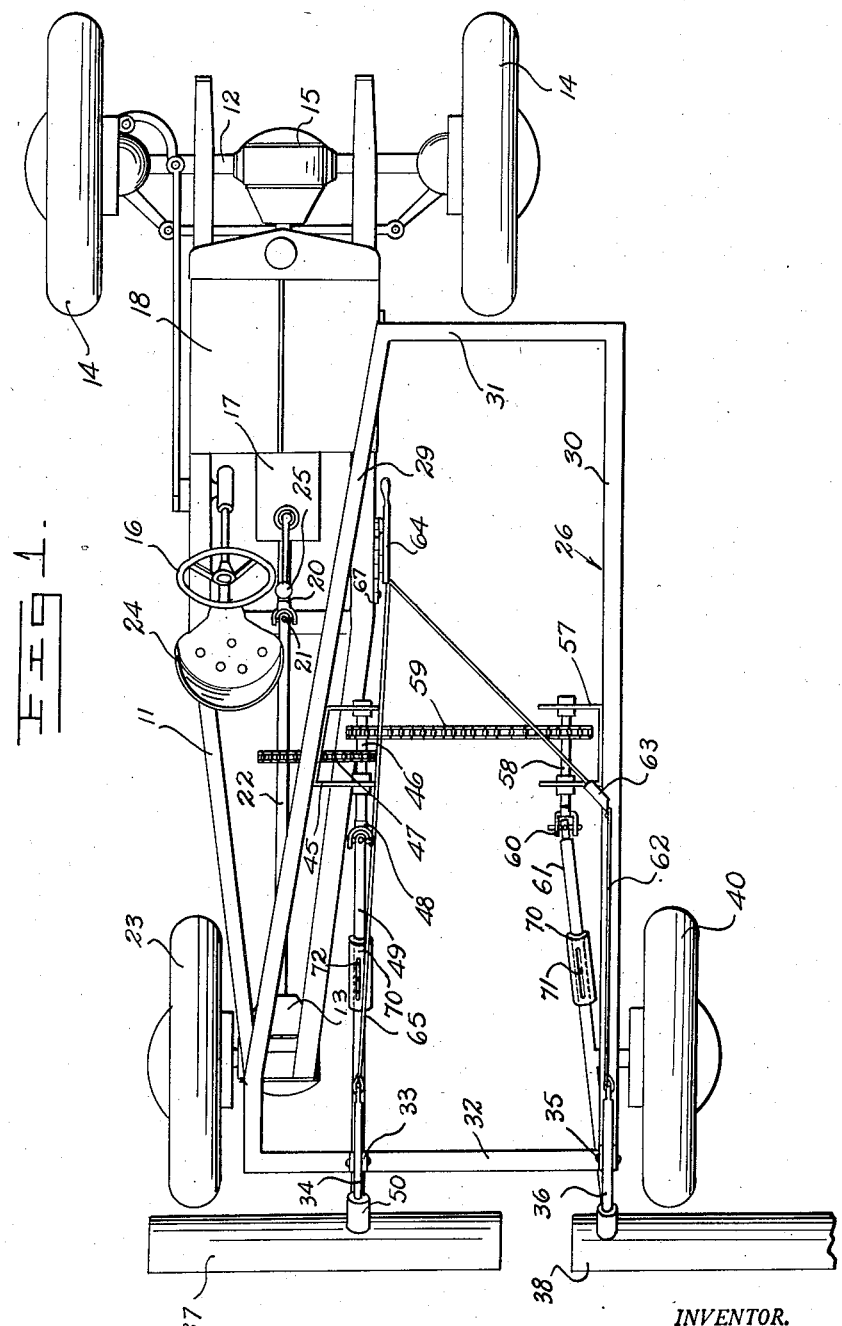

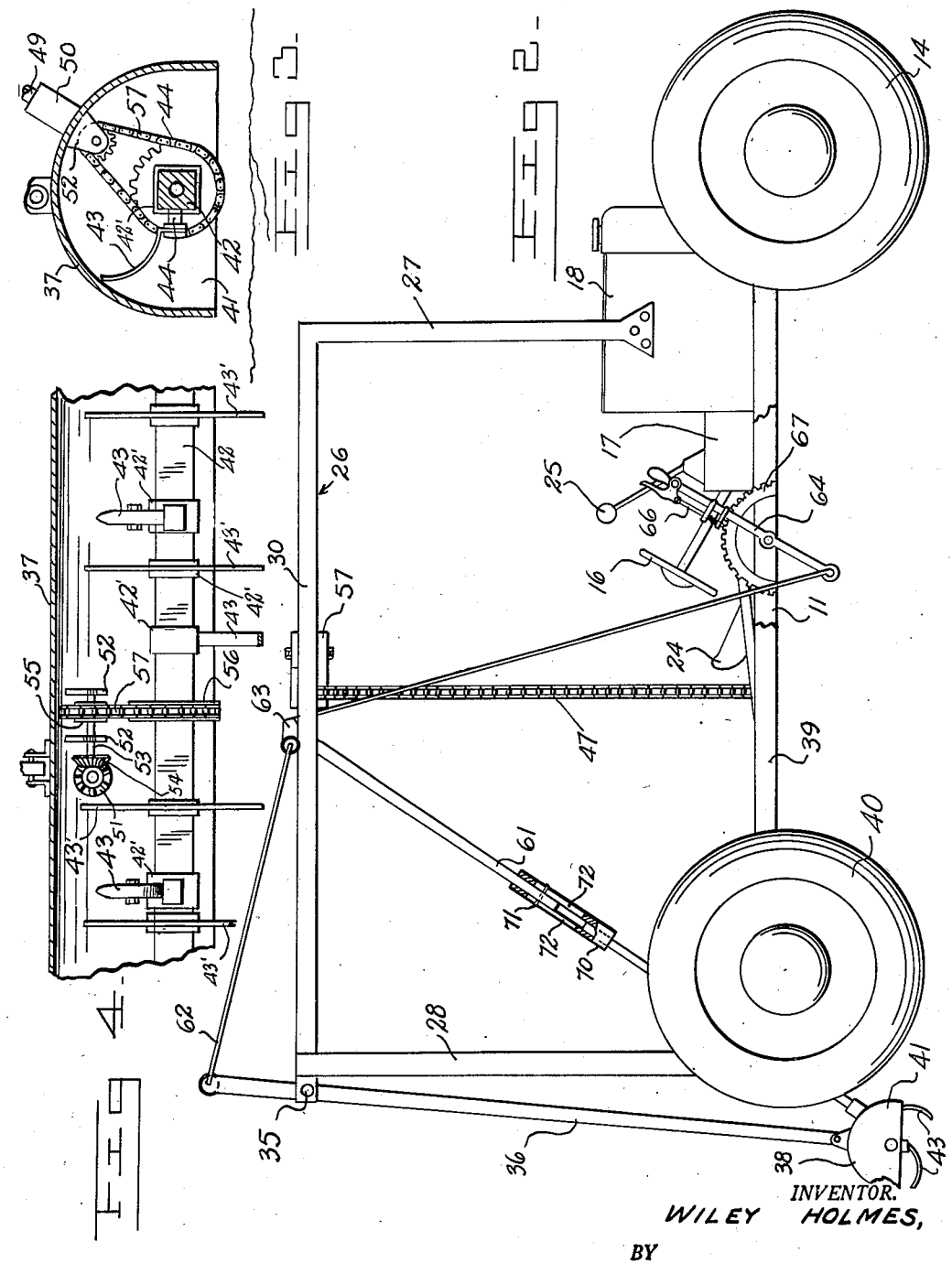

2,554,030

UNITED STATES PATENT OFFICE 2,554,030

ROTARY PLOW

Wiley Holmes, Holmes Mill, Ky.

Application April 25, 1947, Serial No. 743,774

3 Claims. (Cl. 97—40)

This invention relates to agricultural machinery and more particularly to power driven cultivating machines.

A main object of the invention is to provide a novel and improved cultivating machine which is very simple in structure, easy to operate and efficient in performance.

A further object of the invention is to provide an improved cultivating machine which is inexpensive to build, economical to operate and which may be employed to cultivate soil on both sides of growing crops by straddling said rows and without damaging the crops.

A still further object of the invention is to provide an improved cultivating machine which will prepare the soil for planting in one operation thereby saving the tiresome labor of plowing, discing and harrowing in separate operations.

Further objects and advantages of the invention will become apparent from the following description and claims, and from the accompanying drawings, wherein:

Figure 1 is a top plan view of a cultivating machine constructed in accordance with the present invention.

Figure 2 is a side elevational view of the cultivating machine of Figure 1.

Figure 3 is an enlarged cross-sectional detail view taken transversely through one of the toothed rotor units employed in the cultivating machine of Figure 1.

Figure 4 is an enlarged detail longitudinal sectional view taken through a toothed rotor unit housing employed in the machine of Figure 1.

Referring to the drawings, 11 designates the underframe of the machine, said underframe being rigidly secured at its forward end to a drive shaft housing 12 and at its rearward end to a bevel gear housing 13. Front wheels 14, 14 are provided which have conventional axle structure and have driving shafts extending through drive shaft housing 12. A conventional differential 15 is provided between said driving shafts. The front wheels 14, 14 are steered by a conventional steering linkage controlled by a steering wheel 16. The wheel driving shafts are driven through a conventional transmission 17 and differential 15 by an internal combustion engine 18 mounted on the forward portion of the underframe 11. The torque shaft, shown at 20 is connected by a universal joint 21 to a rearwardly extending shaft 22 which is geared to a rear wheel 23 by suitable bevel gears contained in housing 13. Front wheels 14, 14 and rear wheel 23 are therefore simultaneously driven by engine 18. The front wheel axles are connected by universal joints to their driving shafts so that steering of said front wheels may be accomplished while they are being driven. The torque shaft 20, which drives both the front wheels 14, 14 and the rear wheel 23 is coupled to the driven shaft of transmission 17 by suitable gearing, so that said transmission is effective to select the same operating speed simultaneously for all three traction wheels.

A suitable driver's seat 24 is mounted on the underframe 11 adjacent the steering wheel 16 and the control lever 25 of transmission 17.

Secured to the underframe 11 and to the engine housing is a laterally extending frame structure, designated generally at 26, which includes vertical post members 27 and 28, top longitudinal frame members 29 and 30 and top transverse frame members 31 and 32. Pivoted to the intermediate portion of rear transverse frame member 32 at 33 is a first inclined boom 34 and pivoted at 35 to the end portion of member 32 adjacent longitudinal top frame member 30 is a second inclined boom 36. Secured to the lower end of boom 34 is a transverse channel-shaped housing 37 and secured to the lower end of boom 36 is a similar transverse housing 38.

Frame structure 26 is generally box-like and has a lower outer longitudinal frame member 39 which is substantially in the same horizontal plane as underframe 11 and is rigidly braced thereto. Axially aligned with wheel 23 and journalled to said frame member 39 is a rear wheel 40 which supports the outer rear corner portion of the machine on the ground.

The channel-shaped housings 37 and 38 are provided with end walls, such as shown at 41, and journalled in the end walls of each of said housings is a shaft 42 which is square in cross-section at its intermediate portions.

Slidably mounted on the squared intermediate portions of the shafts 42 are a plurality of square collars 42', each collar carrying a radial stud 44 projecting normally from one surface thereof. Secured to the stud is a curved tine 43, each collar therefore carrying a single curved tine 43. Secured to each of the shafts 42 are a plurality of substantially uniformly spaced harrowing discs 43'.

Journalled in a U-shaped bracket 45 secured to top inner longitudinal frame member 29 is a shaft 46. Shaft 46 is coupled by a sprocket chain 47 to drive shaft 22, said chain engaging suitable sprocket wheels carried respectively by shaft 46 and shaft 22. Connected to shaft 46 by a universal joint 48 is a rearwardly extending downwardly inclined shaft 49 which is journalled in rotor housing 37 at 50 and carries at its lower end in said rotor housing a bevel gear 51. Journalled in depending parallel bearing lugs 52, 52 in said rotor housing is a shaft 53 provided with a bevel gear 54 which meshes with bevel gear 51. Shaft 53 carries a sprocket wheel 55 and shaft 42 carries a sprocket wheel 56 opposite sprocket wheel 55. A sprocket chain 57 engages the sprocket wheels 55 and 56, thus coupling the shaft 42 to shaft 53, whereby shaft 42 is driven by the drive shaft 22 through the chain 47, shaft 46, universal joint 48, shaft 49 and bevel gears 51 and 54.

Secured to outer top longitudinal frame member 30 is a U-shaped bracket 57 in which is journalled a shaft 58. Shaft 58 is coupled to shaft 46 by a sprocket chain 59 engaging suitable sprocket wheels on the respective shafts 46 and 58. Connected to shaft 58 by a universal joint 60 is a rearwardly extending downwardly inclined shaft 61 journalled at its lower end in rotor housing 38, and geared to a shaft in said rotor housing similar to the shaft 53 described in connection with rotor housing 37. This latter shaft is coupled to the toothed rotor in rotor housing 38 by a sprocket chain similar to sprocket chain 57. Each of the shafts 49 and 61 comprises an upper shaft section which is slidably received in a sleeve member 70 rigidly secured to a lower shaft section. The upper shaft section carries a transversely projecting pin 71 whose end portions extend through longitudinal slots 72, 72 formed at opposite sides of the sleeve member 70, whereby the lower shaft sections may move axially with respect to the upper shaft sections and whereby torque may be transmitted from the upper shaft sections to the lower shaft sections.

Secured to the top end of boom 36 is a cable 62 which extends through an inwardly directed guide sleeve 63 secured to top frame member 30 and is fastened to the lower end of a hand lever 64 pivoted to underframe 11 adjacent driver's seat 24. A similar cable 65 is secured to the top end of boom 34 and is connected to the lower end of hand lever 64. Hand lever 64 is provided with a manually controlled locking dog 66 which is engaged with a toothed sector 67 secured to underframe 11 to releasably lock the hand lever 64 in a desired position. When hand lever 64 is in a forwardly rotated position, the booms 34 and 36 are in downwardly swung positions, whereby the toothed rotors carried thereby are in operative ground engagement, and provide a cultivating action on the soil as the machine is driven forwardly along its course. When hand lever 64 is in a rearwardly rotated position, the booms 34 and 36 are swung clockwise from the position shown in Figure 2, and the toothed rotors carried thereby are lifted to inoperative positions.

The spacing of the wheels 14, 14, 23 and 40 and the spacing of rotor housings 37 and 38 is such that the machine may straddle a row of growing crops and cultivate the soil on both sides thereof without injury to the crops.

While a specific embodiment of a cultivating machine has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A cultivating machine comprising an underframe, a prime mover mounted on said underframe, a box-like upstanding frame structure secured to said underframe and including a transversely extending upper rear frame member, a boom pivoted at an intermediate point thereof to said upper rear frame member for pivotal movement in a longitudinal vertical plane, the rear portion of the boom being relatively long as compared with the forward portion thereof with respect to said intermediate point of pivotal connection to said upper rear frame member, whereby the rear portion of the boom is biased downwardly by its weight, a transversely extending trough-like housing secured to the rear end of the boom, a toothed rotor journalled axially in the housing, means secured to the forward end of the boom for pivoting said boom to move the rotor rearwardly and upwardly, a longitudinal drive shaft journaled to the intermediate portion of said frame-structure, means connecting said drive shaft to said prime mover, and downwardly and rearwardly inclined shaft means connecting said drive shaft to said rotor.

2. A cultivator attachment for connection to a tractor comprising a vertically disposed box-like frame including upper and lower frame members, said frame positioned longitudinally on one side of said tractor adjacent the rear thereof and secured thereto, a wheel rotatably journalled in said lower frame member and adapted to traverse a ground surface, a vertically disposed boom positioned adjacent the rear of said frame and pivoted intermediate its ends on said upper frame member for pivotal movement in a longitudinal vertical plane, a trough-like housing disposed transversely of said boom and fixedly secured to the lower end thereof, cultivating means rotatably supported within said housing and adapted to engage said ground surface, and means operatively connecting said cultivating means to the drive shaft of said tractor.

3. A cultivator attachment for connection to a tractor comprising a vertically disposed box-like frame including upper and lower frame members, said frame positioned longitudinally on one side of said tractor adjacent the rear thereof and secured thereto, a wheel rotatably journalled in said lower frame member and adapted to traverse a ground surface, a vertically disposed boom positioned adjacent the rear of said frame and pivoted intermediate its ends on said upper frame member for pivotal movement in a longitudinal vertical plane, a trough-like housing disposed transversely of said boom and fixedly secured to the lower end thereof, cultivating means rotatably supported within said housing and adapted to engage said ground surface, means operatively connecting said cultivating means to the drive shaft of said tractor, and manually actuable means operatively connected to said boom for effecting the movement of the latter to any select position with respect to said ground surface.

WILEY HOLMES.

REFERENCES CITED

The following references are of record in the file of this patent:

UNITED STATES PATENTS

| Number | Name | Date |
|---|---|---|
| 144,820 | Allen et al. | Nov. 25, 1873 |
| 1,689,550 | Dick et al. | Oct. 30, 1928 |
| 1,843,119 | Bussman | Feb. 2, 1932 |
| 2,187,443 | Beamer | Jan. 16, 1940 |
| 2,483,767 | Hart | Oct. 4, 1949 |